United States Patent [19]

Gruenberg

[11] Patent Number: 4,926,478
[45] Date of Patent: May 15, 1990

[54] METHOD AND APPARATUS FOR CONTINUOUSLY ACKNOWLEDGED LINK ENCRYPTING

[76] Inventor: Elliot L. Gruenberg, 6040 Boulevard East, West New York, N.J. 07093

[21] Appl. No.: 292,505

[22] Filed: Dec. 30, 1988

[51] Int. Cl.⁵ ............................................. H04L 9/04
[52] U.S. Cl. ......................................... 380/21; 380/25; 380/33; 380/47
[58] Field of Search ....................... 380/20, 21, 25, 33, 380/47

[56] References Cited

U.S. PATENT DOCUMENTS

4,805,216 2/1989 Gruenberg ............................. 380/21

Primary Examiner—Salvatore Cangialosi
Attorney, Agent, or Firm—Lieberman, Rudolph & Nowak

[57] ABSTRACT

An authentication system in which communication between two locations is provided by a continuous full duplex bidirectional communications highway, which highway is a secure link between the two locations. Each location transmits information to the opposite location on a bit-by-bit basis, with a previously transmitted bit of information serving as a decoding key for the most recently received bit of information and said received bit in turn serving as the encoding key for the next bit to be transmitted. An authenticated transaction record is provided upon receipt of verified transactional data, and the reception of remotely received information may be authenticated to the sender of such data.

3 Claims, 11 Drawing Sheets

| A | BC |
|---|----|
| 0 | 00 |
| 0 | 11 |
| 1 | 01 |
| 1 | 10 |

FIG. 4 b

| C | BA |
|---|----|
| 0 | 00 |
| 1 | 10 |
| 1 | 01 |
| 0 | 11 |

FIG. 4 c

| B | AD |
|---|----|
| 0 | 00 |
| 1 | 01 |
| 0 | 11 |
| 1 | 10 |

FIG. 4 d

| D | AB |
|---|----|
| 0 | 00 |
| 1 | 01 |
| 1 | 10 |
| 0 | 11 |

FIG. 4 e

| C | DA |
|---|----|
| 0 | 00 |
| 1 | 10 |
| 1 | 10 |
| 0 | 00 |

METHOD AND APPARATUS FOR CONTINUOUSLY ACKNOWLEDGED LINK ENCRYPTING

FIELD OF THE INVENTION

The instant application is a continuation-in-part of copending application Ser. No. 07/001,402, filed Jan. 8, 1987, now U.S. Pat. No. 4,805,216.

The invention described and claimed in Ser. No. 07/001,402, (hereinafter referred to as the '402 invention), relates to an apparatus and method whereby confidential information can be sent over public or private communications facilities in encrypted form without the use of a pre-determined encoding signal. Such an encoding signal is known in the art as a "key" and is electronically added to the confidential information prior to transmission, in order to encode or encrypt the information, preventing unauthorized interception of the information. Upon reception, the identical key is electronically combined with the received message in order to decode or decrypt the information by separating it from the key.

The instant invention is directed to an authentication system which makes use of the feature of inherent authentication of messages present in the invention set forth in the '402 invention. Such a system, as described and claimed herein, may be used as a reliable point of sale credit authorization, and verified transaction recording system, or it may be used as a reliable transfer of funds authorization system. It may further be used to provide trustworthy authentication of sensor data, such as observations at remote sites of nuclear tests to verify compliance with treaty obligations.

DESCRIPTION OF THE PRIOR ART

Prevention of unauthorized access to information can be effected by encoding information prior to transmitting it over public or unsecured private transmission media. As described in the prior art, a simple way to so encode such information is to perform a simple modulo-2 addition of the information sought to be encoded to a key signal, character, or series of characters. This can be accomplished using Exclusive-OR logic gates such as the standard TTL 7486 Quad Exclusive-OR gate manufactured by companies like National Semiconductor Corporation, 2900 Semiconductor Drive, Santa Clara, Calif.

The result of the Exclusive-OR logical operation is shown in the truth table below.

| A | B | C |
|---|---|---|
| 0 | 0 | 0 |
| 0 | 1 | 1 |
| 1 | 0 | 1 |
| 1 | 1 | 0 |

Cryptographic systems generally use two different type key signals; private keys and public keys. In private key type systems, a key is prearranged between the parties and sent by the originating party, either by messenger or some other private means, to the party who will receive the encrypted message. The originating party then encrypts the confidential message and transmits it in encoded form over public or private communications links. The receiving party will then use the prearranged key to decode the encrypted message.

If a series of bits comprising digital message A is 1010, and the key B is a series of bits, 1100, Exclusive-ORing each respective bit of message A with key B at the transmitting station, results in encrypted message C, 0110, being generated. If message C is then Exclusive-OR'd with key B at the receiving station, message A can be decoded (i.e. 1010).

The problem with the private key type of encryption system is that a prearranged key requires prearranged communication. In other words, spontaneous messages cannot be sent between different parties without first somehow communicating to the receiving party the encryption key.

In order to overcome the problems inherent in a private key type system, a public key system can be used whereby the sending and receiving parties each use a separate public key for enciphering and a private key for deciphering. Each party sends messages encoded with the receiver's publicly available enciphering key and deciphers the messages received using his own private deciphering key. Possession of the deciphering key, however, enables any eavesdropper to decipher a message. The use of the public key system is, therefore, more vulnerable to such eavesdropping than the use of a private key system because the public enciphering key is not easily changed once it is widely published.

The '402 invention describes a system whereby no public key is necessary, and no private key need be prearranged prior to the actual transmission of messages. The system described therein, is a system of full duplex communication between stations whereby the exchanged messages themselves provide the necessary enciphering keys for the messages to be encrypted and transmitted from each respective station. The message originating at each respective station provides the necessary deciphering key for the message being received from the other station.

Authentication can be defined as verification that a message contains reliable and trustworthy information and requires that a third party, an authority, be accessible to parties of a transaction to verify authentic messages. Parties to such a transaction can be a merchant, customer, funds supplier (bank for automatic teller machines), funds withdrawer, and in extreme authentication situations, two countries assuring that the terms of a nuclear weapons testing program are verified. The last example involves assuring two parties that data from sensors of nuclear test explosions, is accurate, that true data is sensed at a specific point, and that the received data is valid evidence that the explosion is within agreed upon limits. Each of these cases involve two parties, at least one of which requires trustworthy data upon which to make a decision and some way to authenticate the accuracy of the latest communication. In most cases, this involves communication with an authority who has true and reliable authentication information, or alternatively a system in which both parties can simultaneously observe authentication information.

Prior methods have used various forms of secure communications to insure authentic information is being supplied to the two parties. All such secure communication schemes involve the need for a private key to be available to the parties and the validating authority. The danger is that this key may be broken or stolen. The present invention makes use of a different method of security, which obviates the use of any prior known key.

The '402 invention is a secure enciphered interchange of information between two parties, entities, or locations during a common time interval, wherein the message bits of one party continuously encipher the bits subsequently transmitted by the other party, bit by bit. The message of a first party is thus able to decipher the message of a second party.

Such an interchange is unique and random, so that attempts at decipherments by a third party can rely on no systematic basis of attack. Moreover, since no definite message length is required by the '402 invention, messages encoded in long strings of bits become increasingly unique and random by approximately 2N where N is the bit length of the message.

Because the '402 invention does require that a first party encrypt a second party's message, the receipt of messages by one party is acknowledgement that the other party:

1. Received the message;
2. Enciphered the message with the first party's message; and
3. Transmitted a message decipherable by the first party.

Each party perceives that he is receiving encrypted data that he can decipher with his unique key (i.e. his message sequence). Hence, each party has authentication that his message has been received by a party he has selected and no other. The message content received by each party can now be used to validate the credentials of either or both parties.

Validation or authentication of individuals can be done by matching message content with previously stored identification information. This can be contained in a "code book" data bank which stores identifiers as strings of bits.

The instant invention, in connection with a data bank, can, thus, be used for extremely reliable checking of valid customer identity at the "point of sale," as well as transaction validation and recording at credit centers.

Validation of an individual identity may be enhanced by the observation of the amount of the delay time compensation needed to register the received sequence of bits with the locally generated sequence. Such delay time compensation is described in Ser. No. 07/001,402, the contents of which are incorporated herein by reference. This delay in some situations, such as a battlefield, can provide a very accurate indication of distance between parties and, thus, verifies if the other party is at a location where the party is expected to be.

It is, therefore, an object of the instant invention to provide a cryptographic system for confidential exchange of information over public communication systems, which does not require the use of a public or prearranged private key.

It is a further object of the invention to provide secure bidirectional communications, relatively inexpensively.

It is a still further object of the invention to provide an encryption system which is easy to use.

It is another object of the instant invention to provide authenticated point of sale transaction documents to merchants while also providing a record to the customer.

It is a further object of this invention to provide a reliable authorization for release of funds at remote locations.

It is a still further object of this invention to provide reliable transmission verification of remote site sensor data to authorized parties.

It is a further object of this invention to provide a two-way secure voice transmission system between authenticated parties.

SUMMARY OF THE INVENTION

In one embodiment described herein, messages are sent in binary form. Bit synchronization protocol is provided by standard communications terminal equipment used in conjunction with the invention, and is added and deleted to the respective messages independent of the present encryption/decryption method. Such protocols are well known in the art, and the synchronizing signals are used to synchronize timing means contained in the terminal hardware of both the sending and receiving stations so that the receiving station recognizes the bits of data sent by the transmitting station in the same sequence, or time compensated sequence, in which they are sent.

In the preferred embodiment of the invention, two communications paths are generally used at all times. This is well known in the art as full duplex communications. One path is used to transmit a signal from station X to station Y, the second path is used to transmit a second signal from station Y to station X.

In the present invention, transmission and reception of both signals by each respective station generally must be substantially simultaneous along both paths in order for successful encryption and decryption to take place. Each character or information word is composed of binary bits. Both stations continuously transmit material to the opposite station on a bit by bit basis; in each respective station, a previously transmitted bit of information serving as a decoding key for the most recently received bit of information, and said received bit in turn serving as the encoding key for the next bit to be transmitted.

The instant invention is directed to an authentication system, which comprises apparatus at a point requiring valid information, linked with a pre-selected point, which pre-selected point contains apparatus which can verify valid information, or which can itself generate authentication information. The communications highway between the point requiring valid information, and the pre-selected point, is a secure link. Specifically, the secure link transmits from a first point, a bit-by-bit message mixed with the message originating from a second point, thereby allowing each point to decipher the transmission with its own message bit-by-bit in order to recover the other message. Intercepting parties cannot decipher the coded message because there is no preestablished organization of the originating messages.

In a first embodiment, the first point seeking valid information is a transaction point where authenticated information is required to complete a transaction, such as a sale to a customer, or a release of funds. In such cases, it is also desired to generate a validated record of the transaction.

In a second embodiment, the first point seeking valid information is, for example, a computing center for determining the size of a remote nuclear explosion. The second valid information point is at a remote site in a host country containing data sensors and a host monitor which requires continuous validation that only the agreed upon computing center is receiving the valid sensor information.

It is, therefore, a feature of the present invention that a confidential exchange of information is provided between stations by utilizing a full duplex communication system.

It is another feature of this invention that the key used to encode the message to be transmitted by each respective station is the received and decoded message from the opposite station.

It is a still further feature of the invention that the key used to decode the message received at each station is the message originating at each respective station.

It is a further feature of this invention that it can be used in conjunction with other methods of scrambling and descrambling to enhance the security of the messages.

It is a feature of the invention that any form of a continuous full duplex, bi-directional communications highway may be used between the "valid information seeking" and the "valid information providing" points or sites.

It is a further feature of the invention that the valid information exchanged between points is protected from interception by a secure link using the message bits of each party as the key for the other, thus excluding tampering or interception by any third party.

It is a still further feature of the invention that an authenticated transaction record will be provided upon receipt of transactional data and identification of certain inputs such as signature card, numbers, pass words, test history data, etc., thereby obviating the need for generating local copies (carbon copies).

It is another feature of the instant invention that the reception of remotely received information such as sensor data, and the accuracy of transmission, may be authenticated to the sender of such data, while at the same time the receiver of the data may authenticate the truth of the remote data, and the accuracy of its transmission.

It is a further feature of this invention to provide secure communication between two parties while requiring only one party to provide input.

These and other objects and features of the present invention will be more fully understood from the following description of an illustrative embodiment, when taken in conjunction with the following drawings.

DESCRIPTION OF THE INVENTION

Standard communications terminals are used to interface each sending and receiving station described below with the respective communications lines and are not included in the description below. Circuitry for, and discussion of, bit synchronization protocol included in the communications terminals of both stations is well known in the prior art and, therefore, omitted herein for the sake of brevity.

Figure 1:
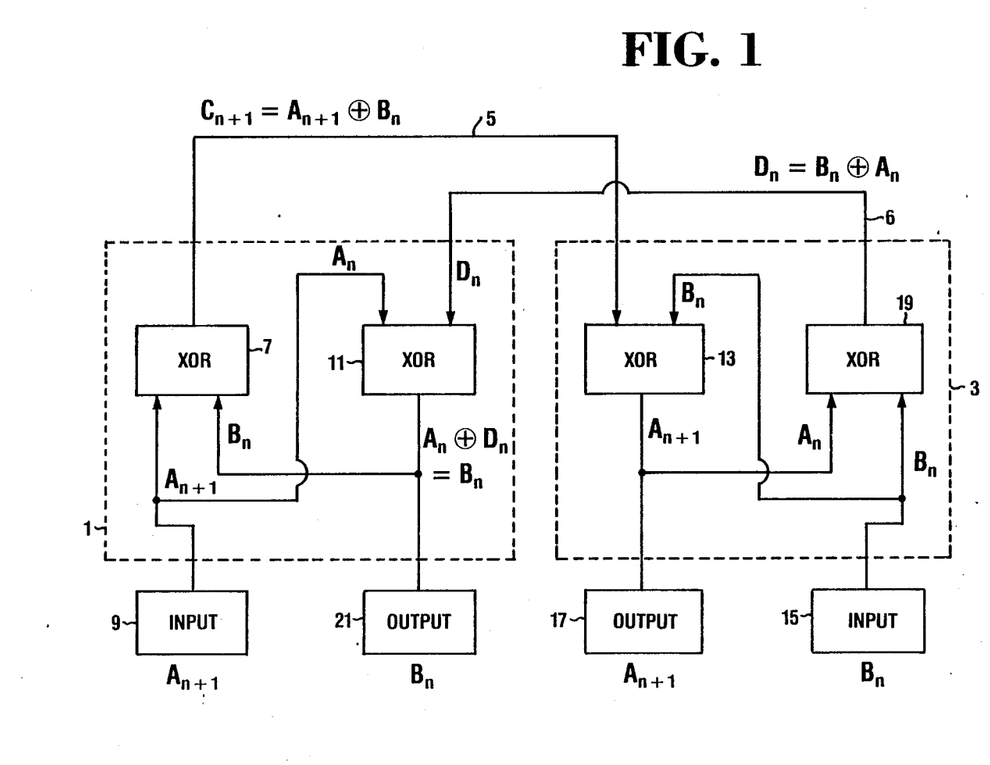
FIG. 1 is a block diagram of a basic embodiment of the invention described in Ser. No. 07/001,402.

In FIG. 1, Exclusive-OR gates 7, 11, 13 and 19 are used as mixers for various signals and provide the means for encrypting and decrypting the signals. The words encode, encoded and encoding are used herein to describe the process of encryption and the words decode, decoded and decoding are used to describe the process of decryption. The symbol $\oplus$ is used herein to describe the Exclusive-OR logical operation. Assume for purposes of this description, that station X1 seeks to establish communication with station Y3. Station X1 initiates this communication by transmitting a binary data stream, comprising signal A to station Y3, along line 5.

Signal A, a first bit sequence, initially consisting of random data of a non-confidential nature, is inputted to station X1 at input 9. Station Y3 has not yet begun transmitting and, therefore, no incoming signal over line 6 is being received by station X1 at this point. Exclusive-OR gate 11 includes switch circuitry well known in the art, so that it will not function unless a signal is detected on line 6. Similarly, Exclusive-OR gate 13 in station Y3 will not function until a signal is received along line 5.

With no signal present on line 6, decoding Exclusive-OR gate 11 is not functioning and, therefore, only signal A is inputted to encoding Exclusive-OR gate 7. Signal B, a second bit sequence, is generated at input 15.

Signal C, a third bit sequence, results from the logical mixing in gate 7 of signal A and the output of gate 11. When no signal is detected on line 6 by station X1, the output of gate 11, therefore, is a logical "0" and signal C equals input signal A.

Signal C is transmitted over line 5 to station Y3 and mixed with signal B by decoding Exclusive-OR gate 13. Gate 13 becomes active only upon detection of incoming signal C on line 5. Since signal B still has not been inputted at input 15 of station Y3, the output of gate 13 is equal to signal A. Up to this point, signal A has been sent completely in the clear, i.e. with no encryption, due to the absence of signal B.

Station Y3, therefore, initially begins reception of the random data bits comprising signal A, as output 17 from gate 13.

When signal A is detected at output 17, station Y3 begins transmission of signal B, inputted at 15. Signal B, a binary data stream, can either be a meaningful message or a random data. In either case, it will be mixed with the received data of signal A, on a bit by bit basis, by being Exclusive-OR'd in encoding gate 19, prior to being sent to station X1 as data stream signal D, a fourth bit sequence, via line 6.

As indicated in FIG. 1, bit $A_n$ of signal A, is Exclusive OR'd with bit $B_n$ of signal B, in gate 19. The output of gate 19, bit $D_n$ is, therefore, equal to $B_n \oplus A_n$, and it is transmitted to station X1 via line 6.

At station X1, upon detection of signal D on line 6, gate 11 is activated and bit $D_n$ is Exclusive-OR'd with bit $A_n$ by gate 11. $D_n$ equals $B_n A_n$. The output of gate 11 is, therefore, $(B_n \oplus A_n) \oplus A_n$, which equals $B_n$, which, thus decoded, is available at output 21.

When station X1 thereby begins reception of data stream B, it begins to use the decoded bits of signal B to encode subsequent bits of Signal A. At this time, station X1 could begin sending message bits, rather than random data bits.

The next bit of data stream A, bit $A_{n+1}$ is Exclusive-OR'd with bit $B_n$ by gate 7 yielding bit $C_{n+1}$, which equals $(A_{n+1}) \oplus B_n$, which is transmitted to station Y3 over line 5. At station Y3, $C_{n+1}$ is Exclusive-OR'd with bit $B_n$ in gate 13, yielding decoded bit $A_{n+1}$ at output 15.

The process continues in the same manner for each subsequent bit of signals A and B, until both messages have been completely exchanged.

As long as both stations continue to transmit substantially simultaneously to each other, data streams C and D will remain encrypted.

In order for security to be maintained, the transmission and reception of signals between station X1 and Y3, and the encoding and decoding of gates 7, 11, 13 and 19 must take place on a bit by bit basis, substantially simultaneously. As used herein, substantially, simultaneously means transmission of message bits between stations during a common time interval, each message being encoded, bit-by-bit, by the other message during such common time interval when taking into account, initial start-up delay and delay times caused by the distance between stations and circuit limitations. It is, of course, understood that storage means and/or delay means, could be used at each station for temporary storage of message bits, as long as encoding and decoding occur on a bit-by-bit basis.

Figure 2:
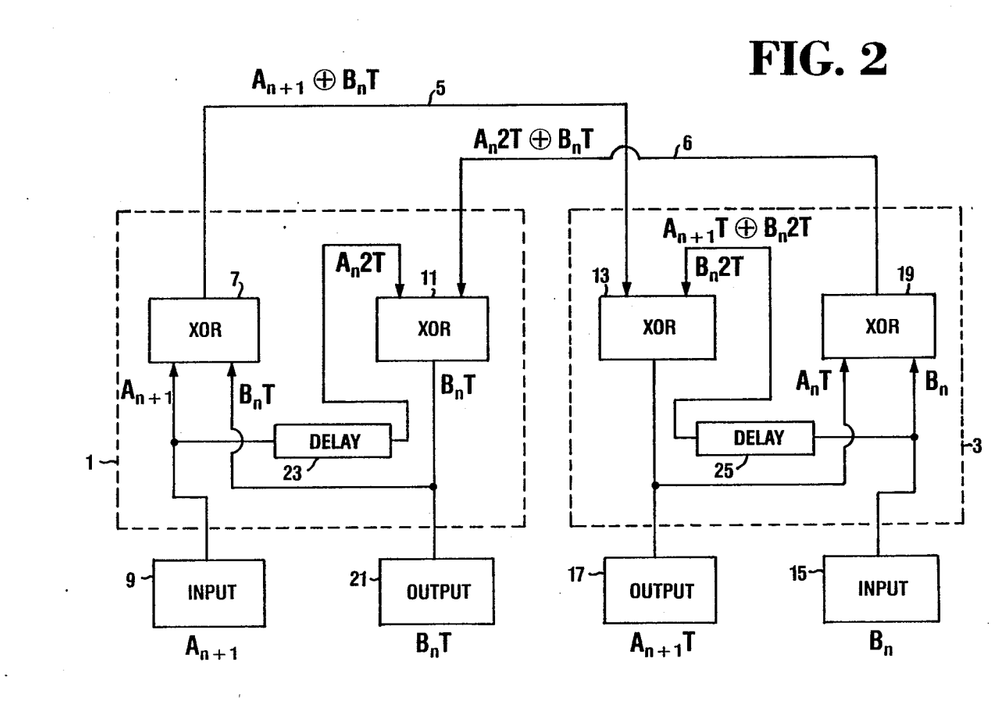
FIG. 2 is a block diagram of a preferred embodiment of the invention described in Ser. No. 07/001,402.

FIG. 2 describes a preferred embodiment of the invention, described in Ser. No. 07/001,402, which includes means for the system to compensate for the transmission delay caused by the respective communications paths, i.e. distance, circuitry, etc.

To initialize communications, the originating station, in this example station X1, must ascertain the round trip delay time between itself and station Y3. This is measured by transmitting a signal along line 5 and measuring the delay time between transmission and reception of its echoed signal returned along line 6. This is done while station Y3 is silent. The method of calculating this delay time is well known in the art. For this example, we will assume that the total round trip time is 2T (T along both paths 5 and 6), although the time for transmission along path 5 (T) can be different from the transmission time along path 6 (t) and resulting in a round trip time of T+t.

Station X1 adjusts its delay means 23 to reflect a delay of 2T. The delay means 23 and 25 can be shift registers, charge coupled devices, magnetic core, tape, disk or diskette media, acoustical delay means, or other suitable storage means. The delay means can also be implemented by a programmable microprocessor which would be programmed in a manner well known in the art to perform a signal delay function. The delay time of each of these delay means can be adjusted according to methods well known in the art.

Unless the stations are separated by a large distance, 2T will generally equal only fractions of a second.

After station X1 adjusts its delay means 23, it ceases transmission and station Y3, goes through the same process to determine 2T, in order to set its own delay means 25 to reflect a delay of 2T.

One station Y3 adjusts its delay means 25, it ceases transmission. Station X1 and station Y3 now begin to exchange signals A and B respectively.

For purposes of following the description, assume that messages are being exchanged between the stations and that $A_n t$ (bit n of signal A, as delayed by transmission time T), has been received by station Y3, decoded by gate 13 and used to encode bit $B_n$ of signal B, as inputted to both delay means 25 and gate 19. It is also present at output 17 as one decoded bit of signal A.

As indicated in FIG. 2, gate 19 Exclusive-OR's bit $A_n T$ with bit $B_n$. $A_n T \oplus B_n$ is transmitted to station X1 over line 6. In time T, $A_n 2T \oplus B_n T$ ($A_n T \oplus B_n$ delayed by T), is received at station X1 and inputted to gate 11. The output from delay means 23, $A_n 2T$ ($A_n$ delayed by 2T), is also inputted to gate 11 and is therein Exclusive-OR'd with $A_n 2T \oplus B_n T$ yielding $(A_n 2T \oplus B_n T) + A_n 2T$, which equals $B_n$, (i.e., decoded bit $B_n$ delayed by time T) and present at output 21 as one decoded bit of signal B.

Station X1 continues to input subsequent bits of signal A at input 9. Bit $A_{n+1}$ is inputted into gate 7 where it is Exclusive-OR'd with bit $B_n T$, yielding $A_{n+1} B_n T$. $A_{n+1} B_n T$ is transmitted over line 5 to Station Y3 in time T and is received as $A_{n+1} T \oplus B_n 2T$. $A_{n+1} T \oplus B_n 2T$ is Exclusive-OR'd in gate 13 with the output of delay means 25, which is $B_n 2T$, (bit $B_n$ delayed time 2T). Therefore, the input to gate 13 is $(A_{n+1} T \oplus B_n 2T) \oplus B_n 2T$. The output of gate 13 is decoded bit $A_{n+1}$ delayed by time T and appears at output 17.

Figure 3:
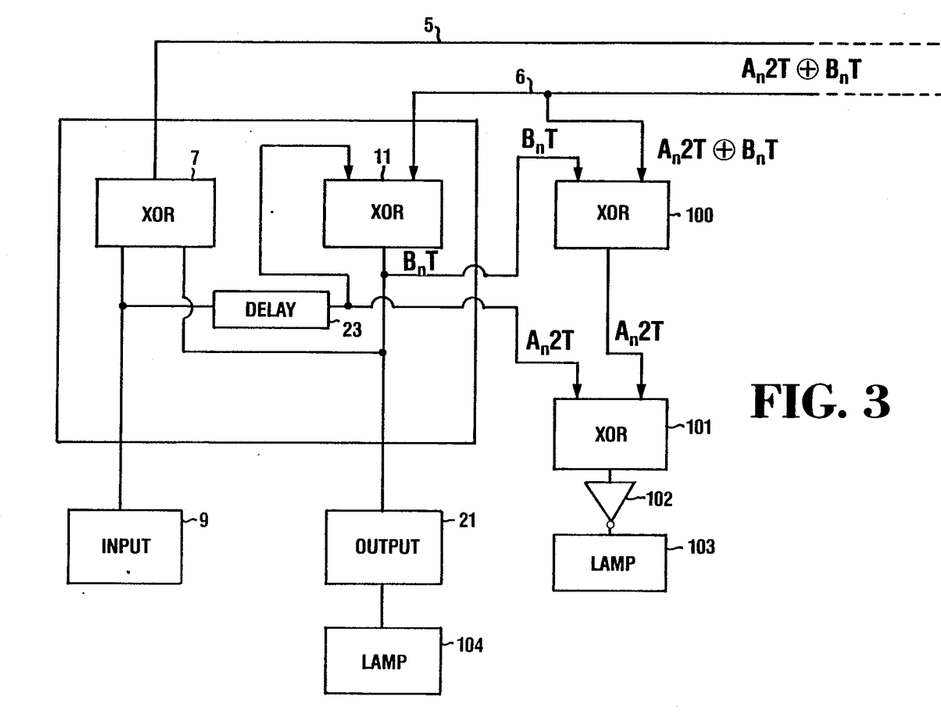
FIG. 3 is a block diagram of one station pictured in FIG. 2, with the addition of apparatus for indication of the proper setting of the delay means and the indication of an incoming message.

FIG. 3 adds to the embodiment described in FIG. 2, means by which each station can adjust its respective delay means without the other side halting its transmission. This is accomplished by connecting Exclusive-OR gates 100 and 101, and inverter 102 as indicated. The output of inverter 102 is attached to lamp 103, which can also be an audible alarm.

The output of gate 11, $B_n T$ (which is decoded bit $B_n$ of signal B delayed by time T) is input to gate 100, along with the encoded signal $A_n 2T \oplus B_n T$ being transmitted from station Y3 over communications path line 6, to station X1.

The output of gate 100 is $B_n T \oplus (A_n 2T \oplus B_n T) = A_n 2T$. This output is one input to gate 101. The output of delay means 23, $A_n 2T$ is the other input to gate 101. The output of gate 101 is connected to inverter 102. The output of the inverter 102 is connected to lamp 103.

When both of the inputs of gate 101 (i.e., $A_n 2T$) are the same, the output of gate 101 will be a logical "0". The logical "0" is inverted by inverter 102 and the resulting logical "1" causes lamp 103 to turn ON. Delay means 23 is adjustable and is adjusted until lamp 103 remains on, indicating that delay means 23 has been set properly to match the delay introduced to the stored bit of signal A, to the round trip transmission time delay introduced by lines 5 and 6, i.e. 2T. When properly calibrated, time delay means 23 assures that received encoded bit $B_n$ is mixed with the same bit of signal A as was used in Station Y3 therein as a key for encoding bit $B_n$ prior to its transmission over line 6.

Means for visually indicating an incoming message is accomplished by attaching lamp 104 to output 9.

Pulse extending means, not shown in the diagram, can be inserted between gate 102 and lamp 103, and between output 9 and lamp 104, in order to prevent flickering which might confuse the status indication.

Figure 4:
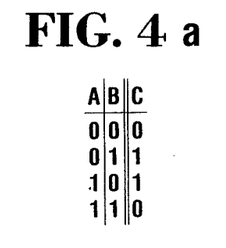
FIG. 4 is a series of truth tables (a)–(e) relating to FIGS. 1 and 2.

FIG. 4(a) shows the truth table for Exclusive-OR gate 7. FIG. 4(b) shows the truth table for Exclusive-OR gate 13. FIG. 4(c) shows the truth table for Exclusive-OR gate 19. FIG. 4(d) shows the truth table for Exclusive-OR gate 11. FIG. 4(e) shows the truth table for lines 5 and 17, assuming they were intruded upon, and an attempt was made to Exclusive-OR their data in order to ascertain either message A or B.

Lines 5 and 6 cannot be logically combined to yield any usable information.

One critical property of the invention described and claimed in Ser. No. 07/001,402, that will be made use of in the instant invention, is the fact the transmission link carries only message sequences uniquely coded as described above, which property precludes any third party from being able to decrypt the transmissions on links 5 and 6. This property allows transmissions between locations which require absolute certainty that such information has not been modified, or tampered with, in transmission.

Figure 5:
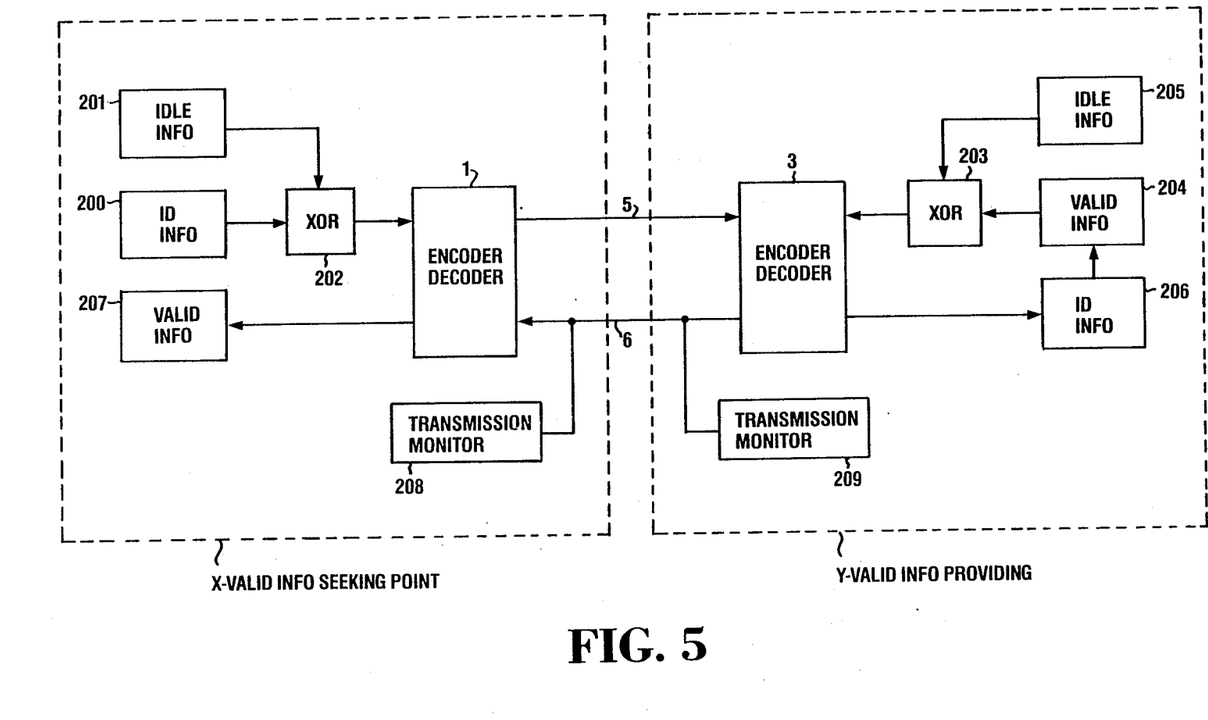
FIG. 5 is a block diagram of the basic authentication system of the instant invention.

FIG. 5 shows a generic embodiment of the present invention. Location X is a point at which valid information is being sought, which location is in communication with location Y via encoding/decoding equipment 1 and 3, and transmission links 5 and 6. Location Y is a source of valid information and is capable of providing the information to any correctly connected point. Elements 1, 3, 5 and 6 constitute the equipment described above with respect to FIGS. 1 and 2.

Location X requires validation information so that a decision can be made as to a purchase, or other transaction of importance. Element 200 consists of a source of identification information, which is presented in binary form by a party who wishes to make a purchase, receive funds, or complete any other type of transaction. The identification information can be a signature, previously authenticated credit card number, a personal history, a photograph, a fingerprint or any other extrinsic or intrinsic identification information. Element 100 can consist of any type of digital storage device such as a ROM or RAM.

Element 201 consists of an idle random information transmitting source, such as a random number generator, to ensure that the communication on links 5 and 6 is continuous and random when transaction information is not being transmitted. Element 202 is an Exclusive-OR gate and element 205 is also a random number generator utilized for the same purpose as element 201. Only one of the idle information sources, 201 or 205, is operative at any one time.

Identification information from element 200 is received by information processor 206. Processor 206 is preferably a properly programmed microprocessor capable of matching incoming identification information with stored identification information. More particularly, this processor is capable of checking a number, or a group of numbers representing predetermined identification information, as is well known in the art, for establishing the veracity of the identifier credentials presented by element 200. For example, one such identification check may be of signatures. Another mode of identification would be the use of a private key or password. Such a password would be compared in a code book with a large number of such passwords.

Upon correct identification of the information as supplied by element 200, a validation signal is provided to validation information element 204. Element 204 transmits a validation message to element 207 at the validation information seeking location X. The validation message may be incorporated in any transaction documentation, or element 207, upon receipt of the validation message and may authorize transmission of funds, or the completion of any critical transaction.

In other situations, the valid information that is provided by location Y can be critical information generated at location Y that must be received authentically at location X. In such a situation idle information provider 201 (random number generator) is used continuously, while valid information from element 204 is being transmitted to output 207.

In any of these cases, the proper operation of transmission links 5 and 6, as well as the remaining elements of the validation system, is checked at each location by transmission monitors 208 and 209. These monitors display the contents of the transmission bit stream on transmission links 5 and 6, and should show a random number during transmission, or the decipherment of information at either 1 or 3, when random numbers are being received. Accordingly, this display is an authentication of the integrity of the process of conveying valid information from one location to the other.

Figure 6:
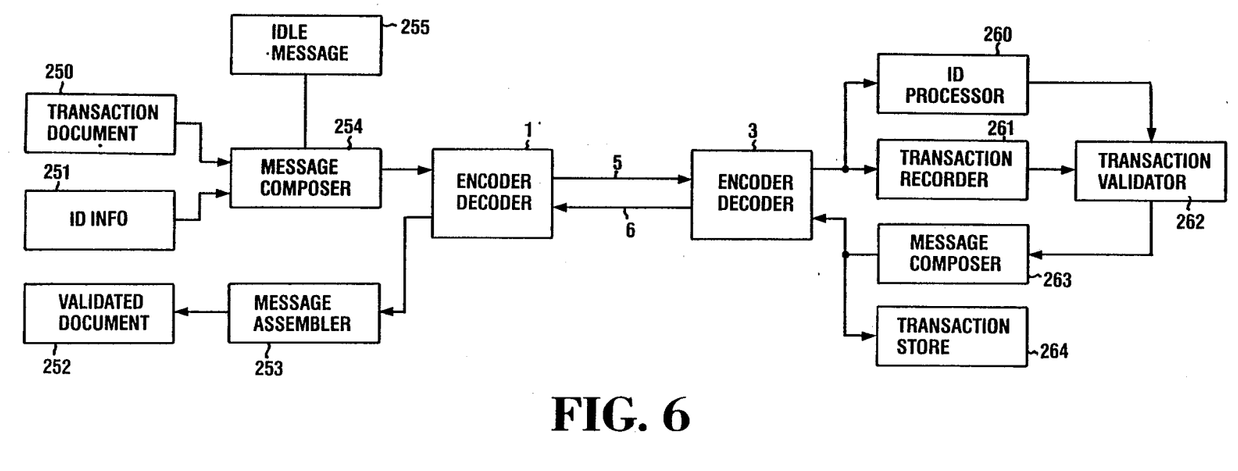
FIG. 6 is a block diagram of a first embodiment of the instant invention in which the invention is used as a point of sale transaction and credit validation system.

FIG. 6 shows an embodiment specifically designed for providing authenticated information at location X. Element 250 is a transaction document converter which converts to electronic form a transaction to be recorded and authenticated. Such equipment is well known and readily available, and can be purchased, for example, from IBM, or other major manufacturers. Element 251 provides identification information, which may take the form of extrinsic or intrinsic identifiers converted into an electronic readable and transmittable medium. The information provided by elements 250 and 251 is combined by message composer 254 into a single binary message for transmission via units 1 and 3, and transmission links 5 and 6, already identified and explained above. The use of the embodiment set forth in FIG. 6, including message composer 254, transaction document converter 250 and identification information element 151 may, of course, take many different forms such as credit card transactions at a point of sale, electronically converted requests for funds, and so forth. When this information is received at location Y, the message is decomposed into the messages to be handled by the identification processor 260 and the transaction recording facility 261. The identification processor 260 will verify the identification information sent by location X, and may take many forms as previously discussed, such as signature verification, checking credit card numbers against valid card numbers in storage, etc. When suitable validation has been achieved by identification processor 260, the transaction validator 262 provides material for a message which is composed in message composer 263. When the message composer is ready to transmit, it composes a new formatted validated document which is returned through the secure communications link composed of elements 1 and 3, and transmission links 5 and 6 as before. A local record at location Y can be kept of the validated transaction in transaction store 264. The validated electronic document is received at message composer 253 and is printed out as a new validated document in validated document processor 252, which essentially replaces the original transaction document which was presented at element 250, but which includes the validated authentication information. In this manner, it is not required that the local point of sale keep copies of the document or provide copies. Purchase requests are kept by the customer as a transaction record and the validated new document can be kept by the merchant. Elements 260-264 can be readily provided by one skilled in the art and can consist of, for example, of specialized digital processing equipment capable of comparing large numbers of digital strings (260), digital storage equipment for retaining data for later use (261, 264), digital processing equipment to classify incoming identified data and determine how the data should be handled (262), and digital processing equipment to format the data to be retrieved to the transmission sites (263). All of the foregoing would be microprocessor based, and properly programmed, by one skilled in this technical field. It is useful at times to have idle messages in a random number form transmitted, while transmissions from location Y are being transmitted to location X so that the transmissions in 5 and 6 are enciphered. Other methods of ensuring continuous encipherment may be used.

It may also be pointed out that the system of FIG. 6 can be facilitated by the use of electronic digital facsimile transmission, which could generate copies of a transaction without requiring carbon copies of bills or other sales and purchase documents. In summary, the authentication system of FIG. 6 is composed of a non-interceptable, tamper proof means of communicating between presenters of credible information, including intrinsic and extrinsic characteristics of uniqueness, and a location where authentication of these characteristics can be carried out to the satisfaction of the extender of some form of credit. The unique characteristic of this authentication system is the use of elements 1, 3, 5 and 6, which makes use of the interchange of message on a bit-by-bit basis, thereby eliminating the possibility of any form of interception.

Figure 7:
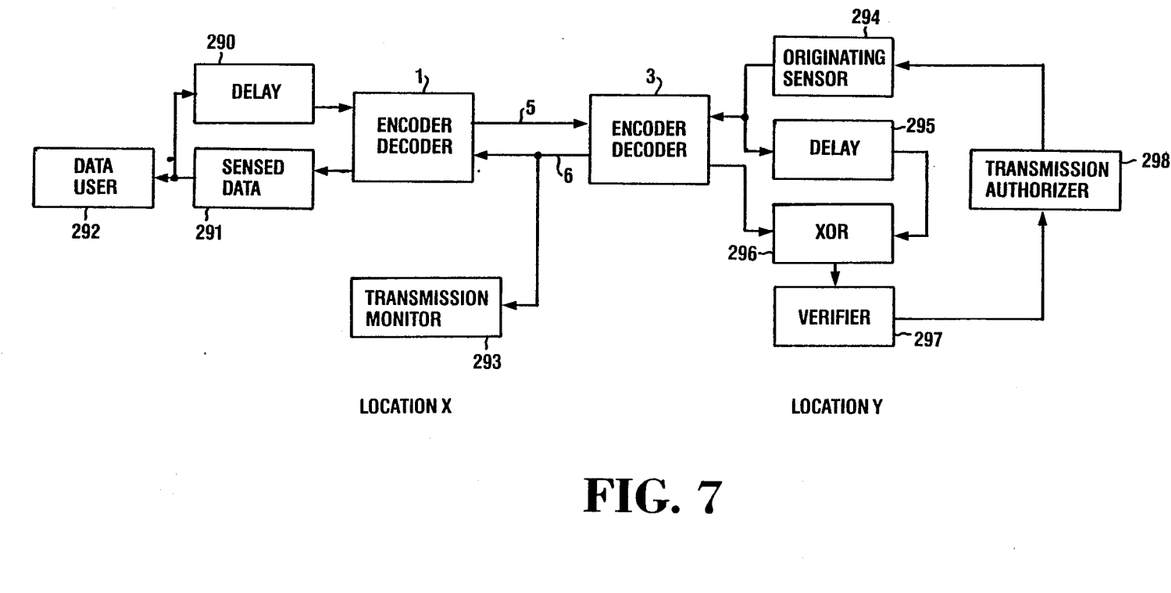
FIG. 7 is a block diagram of a second embodiment of the instant invention for use as a remote site data verification system.

In FIG. 7 is an embodiment of a system for providing authentic sensed data to a remote observation point, such as location X, and at the same time providing credible information to the site, at which it is important to be assured that only the specific remote location X is receiving the information, and that such information is indeed the same information that the host perceives is being generated. This is particularly important in critical situations such as verifying compliance with nuclear test limitation treaties, as in such situations it is of greatest importance that such information is absolutely accurate. In FIG. 7, location X and location Y are linked by the same secure communication system, composed of items 1, 3, 5 and 6 that have been previously described. Element 294 at location Y is the generator of true sensed information, which information is transmitted to the sensed data receiver at 291 and is provided to the data user 292. In this case, a delayed replica of the sensed data is provided to the input of unit 1, by delay unit 290, so that continuously at location Y such a delayed replica is received at comparison point 296. A delayed replica is also provided to comparison point 196 by a delay line 295, which can also be a shift register of preselected bit length delay. The delay input to delay line 295, is the original data generated by element 294, and the delay provided by delay line 295 is the same in bit length to the delay provided by delay line 290.

Authentication is verified at verifier 297 by the observation of a continuous stream of zeros from the comparison unit 296, which is an Exclusive-OR unit. Anything but a string of zeros appearing at the output of comparison unit 296 would indicate that location X is not receiving precisely the sensed information from element 294. Should for any reason such an occurrence happen, verifier 297 would send a signal to transmission authority 298, which has the ability to interrupt the sending of any sensed information until such errors can be corrected. Because of the security of the communication system, no outside parties can tamper with the transmission to the data user. The data user can verify that the secure communication system is working by use of transmission monitor 293, which verifies that the random sequence of numbers is being transmitted, while at the same time location X is able to receive the deciphered information, which is deciphered in unit 1. The delay provided by unit 290 is initially a very small interval during which the initial bits are sent in the clear, but no further undeciphered bits are sent after initiation of the communications sequence.

Figure 8:
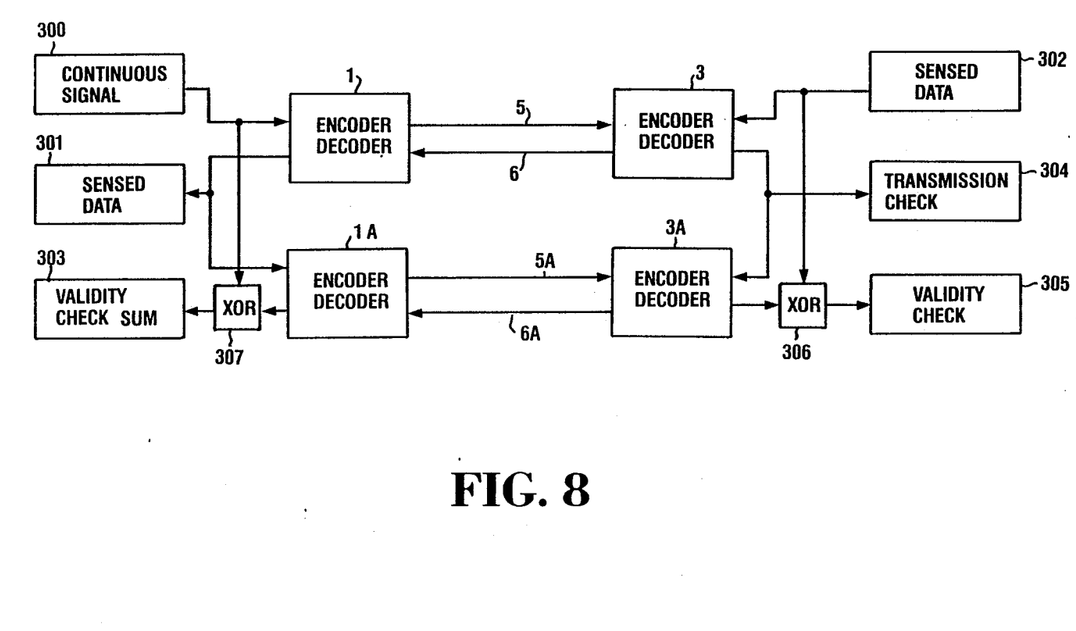
FIG. 8 is a block diagram of a third embodiment of the instant invention, in which there is provided a continuous check on the accuracy of the overall system, including transmission to two sites.

FIG. 8 illustrates a configuration that provides additional security because it requires the use of two secure communication paths for its operation. It also provides a means for location X to be able to securely communicate with location Y, which is the host facility as before. The data originates at location Y, which may be in an inaccessible location, and is supplied by element 302. There are two secure communication systems, one for each link of the type described above. Sensed data from element 302 is received at location X at element 201, where the sensed data is to be used. The sensed data is returned via the second link designated as 1A, 3A, 5A and 6A and is received at the validity check point 305, where it is modulo 2 mixed (Exclusive-OR gated) with the sensed data from element 302 providing a validity check point which will generate a continuous stream of zeros while the correct sensed data is being transmitted, provided that the links are correctly adjusted for any transmission delays. At the same time, a continuous signal, which can be a stream of random numbers (which can be used if desired as an identification signal at transmission check point 304), or an actual message can be securely transmitted from location X to location Y. A continuous signal from element 300 is sent to the transmission check point 304 via elements 1, 3, 5 and 6, and it is directly retransmitted via elements 1A-6A back to location X, where validity of transmission can be checked at element 303 by the modulo 2 mixing and summing of the signal from element 300 in 307, and the signal received from location Y via element 5A. In this way, location X also has a way of determining the presence of any inaccuracies or errors caused by the transmission system, and in this fashion can assure itself of the validity of the data more directly and on an equal basis with location Y. Again, the heart of the system is the completely secure communication links which have the ability to provide both parties continuous authentic monitoring of the same data.

Figure 9:
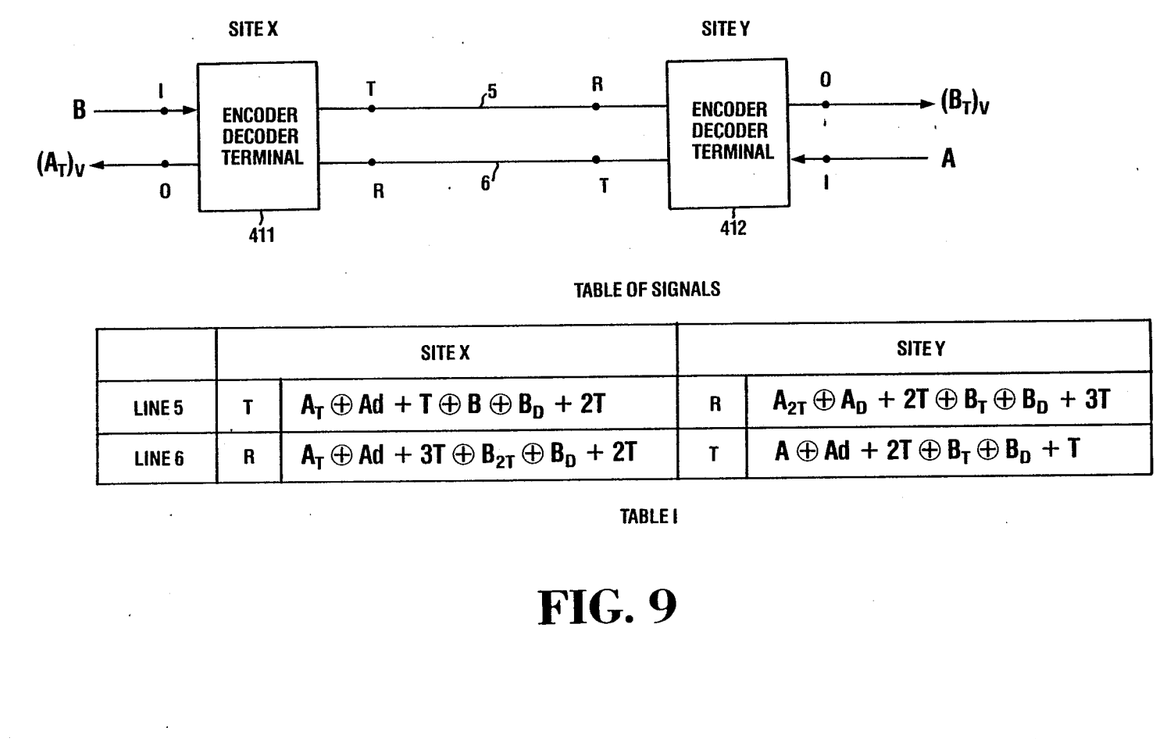
FIG. 9 is a block diagram of an embodiment of the invention, which provides authenticated outputs to both sites using a single transmission link, but does not require both parties to continuously transmit.
Figure 9A:
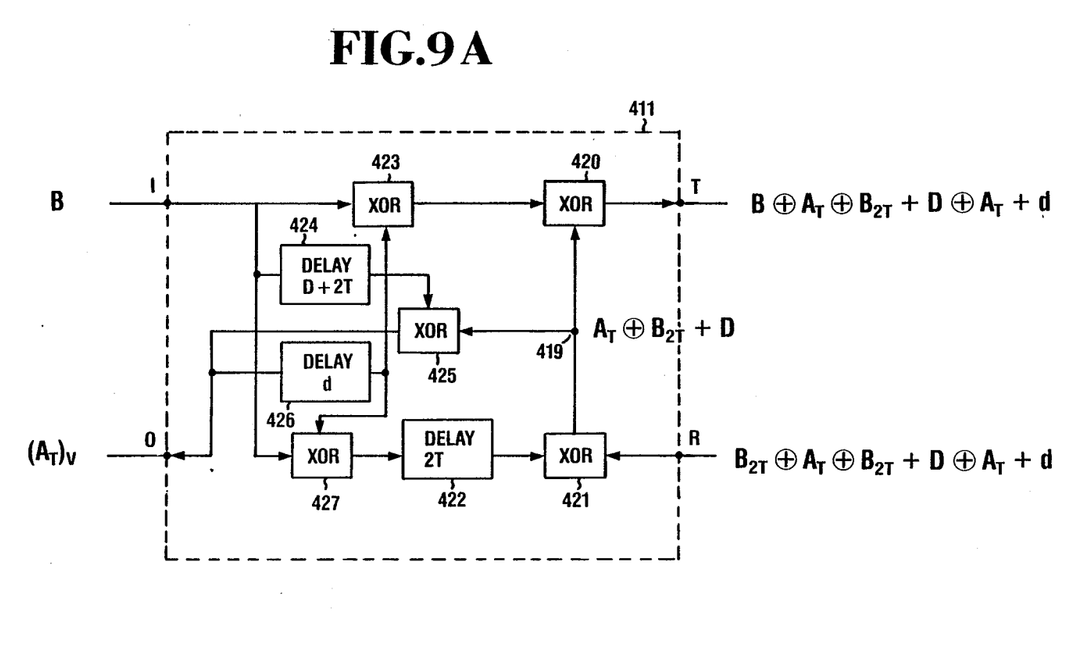
FIG. 9A is a diagram of a transmission terminal for the embodiment of FIG. 9.

In FIG. 9, there is presented a system that will essentially perform the same function of FIG. 8, except that it does not require two independent links but the same link, and yet will provide authentication to both parties that the other party is receiving the transmitted information. The authentication is provided by a modification of the secure communications link of FIG. 1. Elements 1 and 2 of FIG. 1 are replaced by items 411 and 412 of FIG. 9, which contain the modifications for authentication. Referring now to FIG. 9A, delay unit 424 provides delay $2T+D$, where D is an arbitrary delay, characteristic of the input to X, and 2T is the round trip delay between sites. Element 426 provides delay $T+d$, where d is an arbitrary delay characteristic of the input to Y. At site X, A is delayed by T with respect to B. Hence, A(T) appears at receive Port R and $A(T+d)$ appears at the transmit Port T. Note that d and D may be different values. The circuit changes cause the receive port R signal to change from $B_{2T} \oplus A_T$ in FIG. 2 to $B_{2T} \oplus A_T \oplus B(2T+D) \oplus A(T+D)$ in FIG. 9A, and the transmit port T signal from $B \oplus AT$ in FIG. 2 to $B \oplus A_T \oplus B(2T+D) \oplus A(T+d)$ in FIG. 9A. See Table, FIG. 9. The last two terms of each expression must be processed by the authentication circuitry for any output to result at each site, as well as authentication signals of "0"'s at each site. This means that each site is identified by its value of delay d or D.

The input B at the site X is Exclusive-OR'd mixed in 423 in FIG. 9A, with the delayed replica of the output at site X when it is present. The delay d is provided by the delay circuit 426. When there is no output, the output of 423 is simply $B+0$, or B. The output of Exclusive-OR mixer 423 is mixed at 420 with the sequence which is normally AT, the input A of site Y received through line 6, delayed by time T, representing the travel time between site X and Y. However, in this case because of the authentication process, what appears at 419, the input of 420 is $A_T \oplus B (D+2T)$. How this is derived will be described below. The output of site X is derived by Exclusive-OR mixing in 425 a delayed replica of B, delayed by $D+2T$, where T is the one way time delay between the sites as before. When there is no input A, it is understood that there will be 0 bits transmitted instead. What is transmitted from X on line 5 as the output of mixer 420 is the modulo 2 product of $B \oplus A(d+T) \oplus A(T)$ and $B(D+2T)$.

Figure 9B:
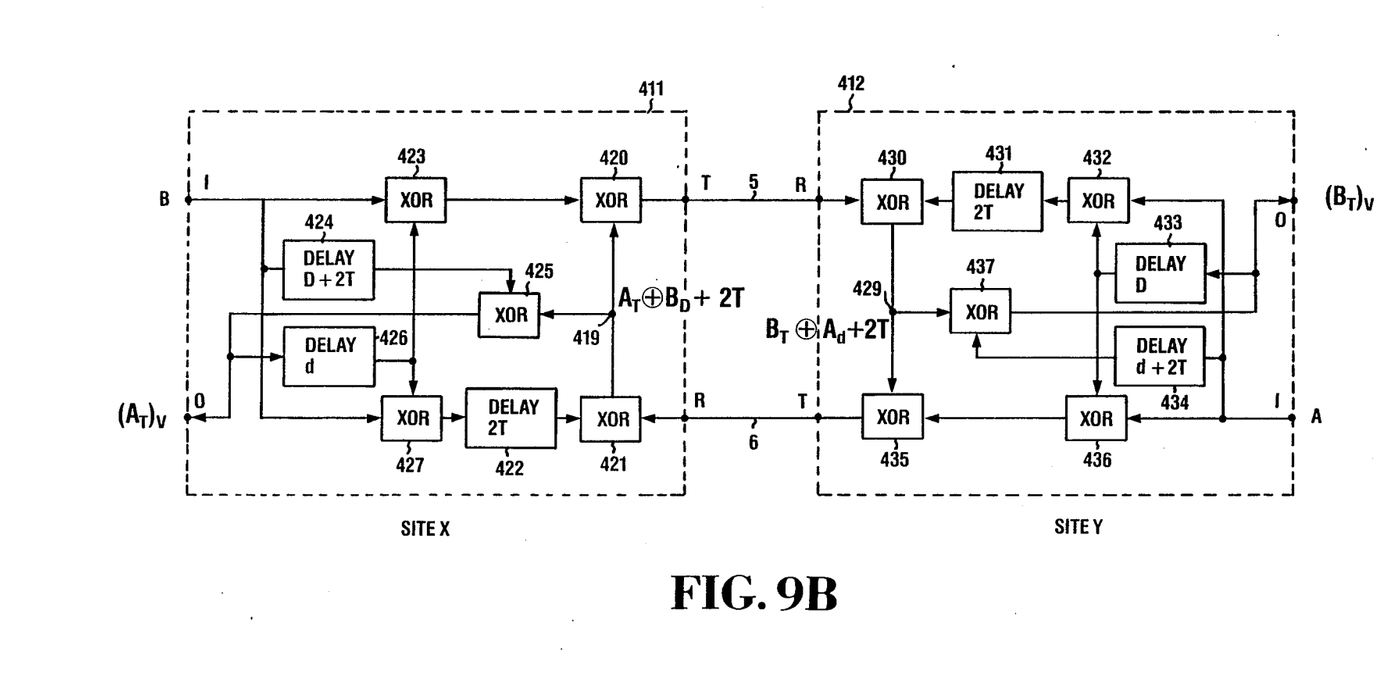
FIG. 9B is a detailed block diagram of the embodiment of FIG. 9.

To further understand the derivation of the inputs to 411 at the receive R port and the use of the output from the transmit T port, we refer to the FIG. 9B. This is a detailed diagram of the full system of FIG. 9, including site Y. A replica delayed by time T of the output of the T port is received at the R port of site Y. Because of the delay this signal becomes $B_T \oplus A2T \oplus B(3T+D) \oplus A(2T+D)$, and is an input to Exclusive-OR mixer 430. This signal is mixed in 430 with the output of item 431 which is a delay of 2T. This delays the output of Exclusive-OR mixer 432, which is $A \oplus B (T+D)$ and results from Exclusive-OR mixing of the input A of site Y, with the output B(T) of site Y delayed by item 433 which provides a delay of D. The local input of mixer 430 is therefore $A(2T) \oplus B (3T+D)$ and mixes with the remote input from the R port of 412 to provide to the resultant data stream 429 of $BT \oplus A(d+2T)$.

In order for the output BT to be readable clear text, it is necessary to mix 429 with a correctly delayed replica of A in 437 obtained by transmitting A thru delay item 434, which is $A(d+2T)$. The output B(T) must be authentic because it is unlocked by the same operator A(d) corrected for transmission time 2T, as was used to encode B at location X. Such deciphering would not be possible unless the delays 426 and 434 matched.

At the same time, a delayed version of the output, $B(T+D)$ enciphers input A in mixer 436, so that after mixing with the signal 429, $B_T \oplus A(d+2T)$ the transmitted sequence is $A \oplus A(d+2T) \oplus B(T) B(D+T)$. When delayed by the transmission time T, this sequence arrives at the receive port of 411 as $A(T) \oplus A(d+3T) \oplus B(2T) \oplus B(2T+D)$. When mixed in 421 with the sequence $B(2T) \oplus A(3T+d)$ derived from input B and output A(T) of location X, the resultant $A_T \oplus B(D+2T)$ is obtained which is sequence 419. This completes the cycle of operations.

Note that the decipherment of A requires delays 424 and 433 to be adjusted to mesh just as the decipherment of B required 426 and 434 to mesh.

Table I shows the sequences found at the transmit and receive ports of X and Y. It is apparent from these tables that this process causes the signals on lines 5 and 6 to be masked at all times either message input is present. If B is not present, the sequence at port TX becomes $A(T) \oplus A(d+T)$, which is a random number unrelated to A(T). At port RX, the resultant is $A_T \oplus A(d+T)$, another random number which does not reveal $A_T$. Similarly, if A is not present, then at port RX, $B_{2T} \oplus B(D+2T)$ is another unrelated random number.

FIGS. 9 and 9B, are an embodiment of a fully authenticated two-way system. The reception of clear text at X is not possible unless the clear text was the input to site Y. Similarly, the reception at Y of clear text, means that clear text was input at X. Further, simultaneous inputs at X and Y are not required to encipher the transmissions; that is, input B at X will be enciphered on both transmission lines 5 and 6, even if the message input A is not present, i.e. A is all 0's. The message B will be received at Y, and all 0's will be received at the output at X, provided that the units 411 and 412 are properly adjusted for time delay, and when the 0 message appears at X, X will have confirmation that an accurate message has been received at Y.

This description shows that neither site can receive clear text unless the correct inputs A and B are present and that the transmission over a single full duplex link is always enciphered no matter whether the other party is transmitting, so that in this case substantially simultaneous transmission is not required.

Because of these properties, the embodiment of FIGS. 9 and 9B are ideally suited for the secure and authenticated transmission of two way telephone conversations.

It is understood that when transmission lines 5 and 6 in the Figures are restricted in bandwidth and contain modems, a delay is caused by the demodulation process of about one-half bit because the demodulation must wait until the modified wave shape representing the bit reaches sufficient amplitude to be distinguished from the other level or noise. This demodulation occurs twice in a system transit required of each bit, or its derivative, so that this process causes a one bit delay in receiving bit B at A's location, and bit A at B's location.

It is further understood that a random number generator can be incorporated in both the transmit and receive stations, which random number generators can be combined via an OR gate with the data being transmitted by each respective station. In so doing, the data being transmitted would be substantially less predictable over the long term and, thus, the system would be substantially more secure to even the most sophisticated attempts at interception.

Although specific embodiments of this invention have been shown and described, it will be understood that various modifications may be made without departing from the scope and spirit of this invention.

I claim:

1. An authentication system comprising means at a first location for converting transaction and identification data into a first binary sequence, means for mixing, bit-by-bit, said first binary sequence with a second binary sequence received from a second location, said mixed first and second binary sequences establishing a third binary sequence, means for mixing, bit-by bit, each bit of said third binary sequence with the said first binary sequence to form a fourth binary sequence, which is transmitted to said second location means at said second location for mixing, bit-by-bit, said fourth binary sequence with said first binary sequence, whereby said second binary sequence is derived at said first location;

means at said second location for processing said first binary sequence to derive said transaction and identification data, and for comparing said identification data with previously stored identification data, and for comparing said identification data with previously stored identification data at said second location, means for receiving transaction data, and means for creating verification binary message for transmittal to said first location.

2. An authentication system, comprising means for converting transaction documents at a selected transaction location into a binary sequence, means to transmit said binary sequence to a validation location mixed, bit-by-bit, with a binary message sequence from said validation location; ( means at said validation location for mixing each bit of said binary sequence with said binary message sequence originating at said validation location to decode an original binary message sequence originating at said selected transaction location, processing means at said validation location for locating and comparing a transaction message with identification data located at said validation location;

means to record said transaction message and means to compose, format and transmit a revised binary message to said transaction location mixed, bit-by-bit, with a second message from said transaction location;

means at said transaction location for mixing, bit-by-bit, a received message from said validation location with said second message originating at said transaction location to decode a third message from said validation location; and means at said transaction location for converting said third message into a validated transaction document.

3. An authenticated secure information transmission system comprising means at a first location for converting information into a first binary sequence and identification data into a prescribed delay of said first binary sequence, and mixing said first binary sequence with a prescribed delayed sequence obtained from a second location characteristic of that location to derive a second sequence which is transmitted to the second location at which it is mixed, bit-by-bit, with sequences of prescribed delay characteristics of that location's identification, and also of said first location so as to derive information from said first location and authentic identification verification of said first location and mixing means at a second location to produce a third binary sequence bearing information and characteristic delay identification characteristics of both said first and second locations, which is transmitted to said first location where it is mixed with binary sequences with delays characteristic of both locations to produce outputs which contain information sent by said second location and an output authentication of the transmission originating at the second location.

* * * * *